June 17, 1941.    V. K. ZWORYKIN    2,246,283
PHOTOELECTRIC MOSAIC
Filed May 1, 1930    3 Sheets-Sheet 1
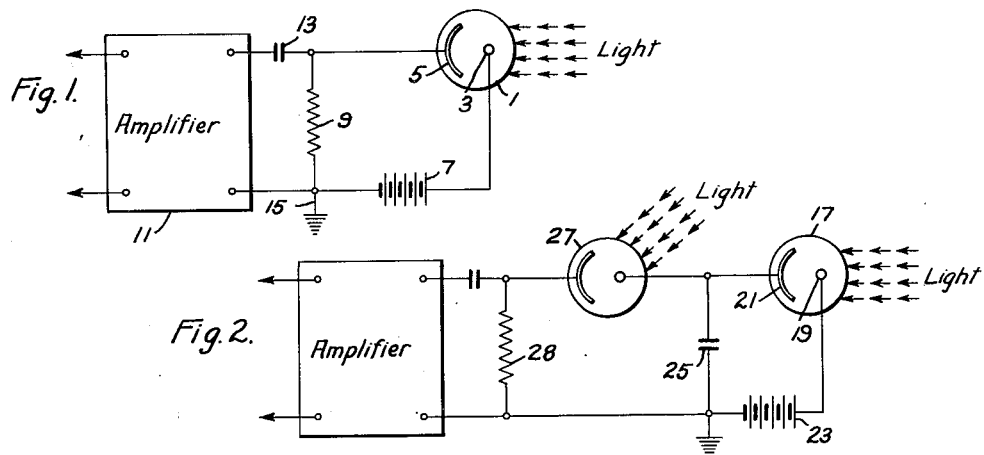
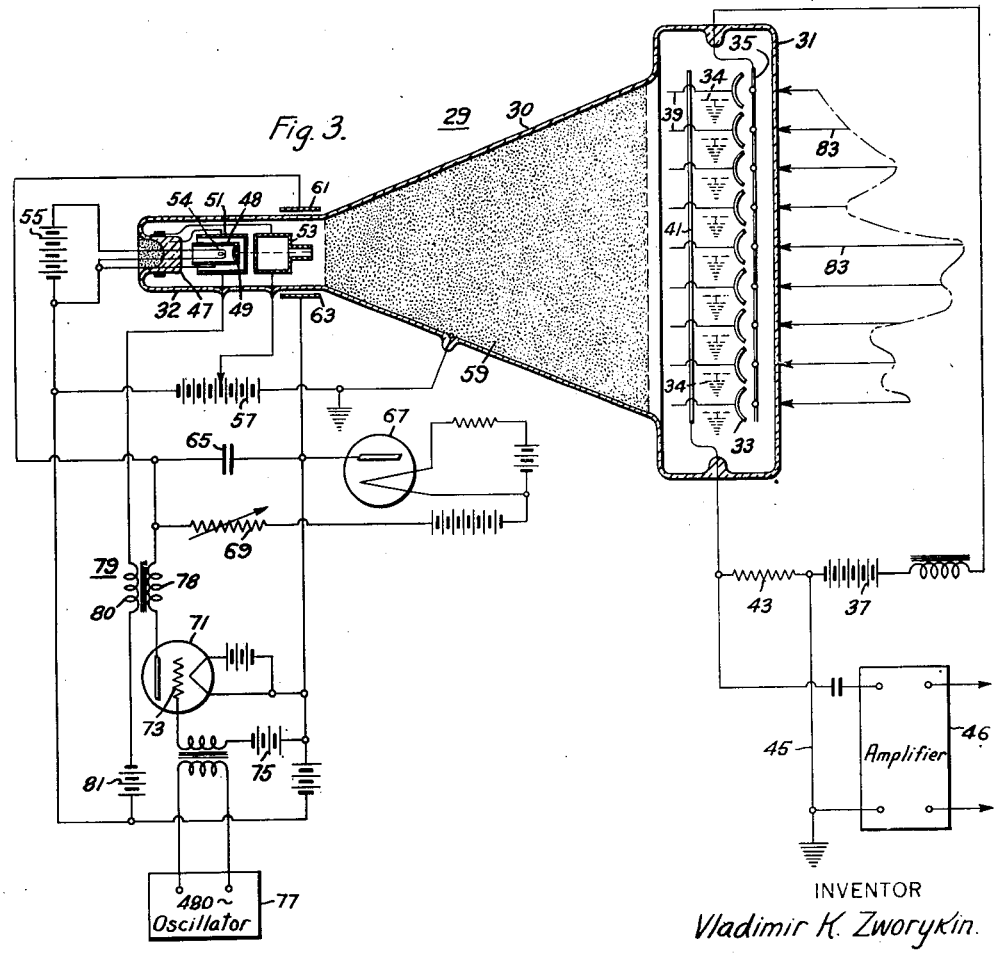
INVENTOR
Vladimir K. Zworykin.
BY
Wesley S. Carr
ATTORNEY

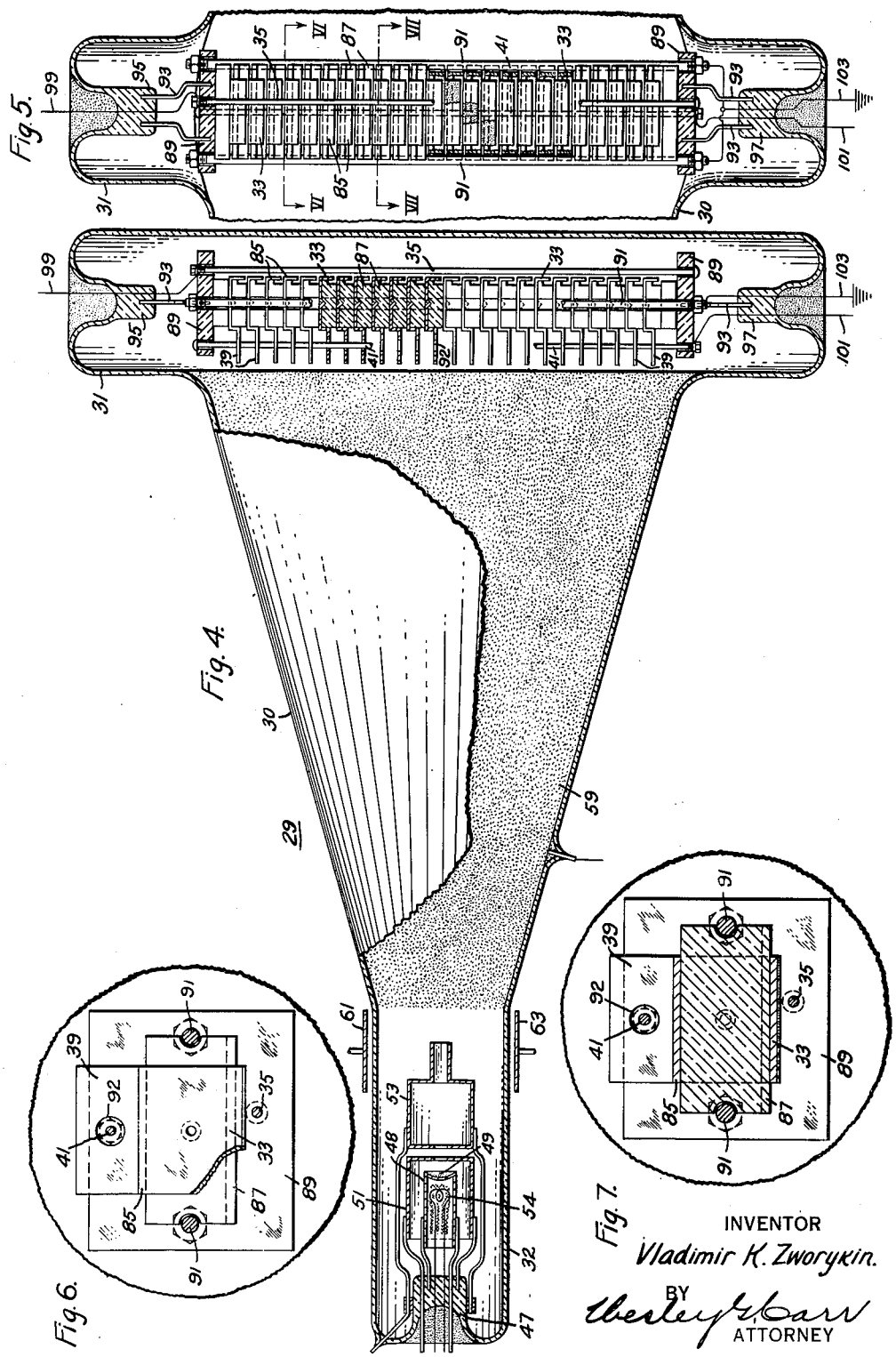

June 17, 1941.  V. K. ZWORYKIN  2,246,283
PHOTOELECTRIC MOSAIC
Filed May 1, 1930  3 Sheets-Sheet 3
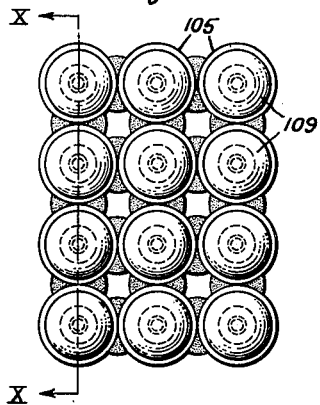
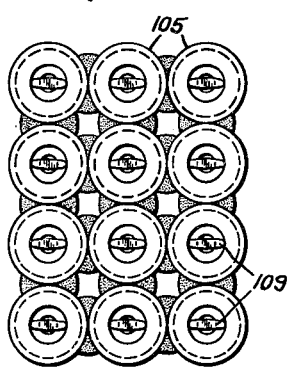
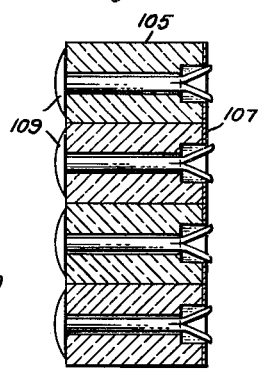
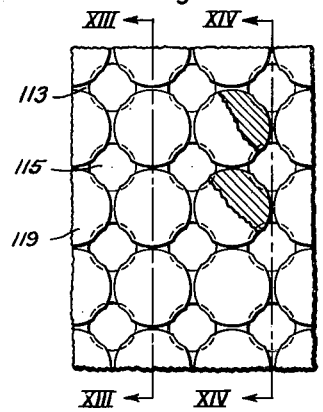
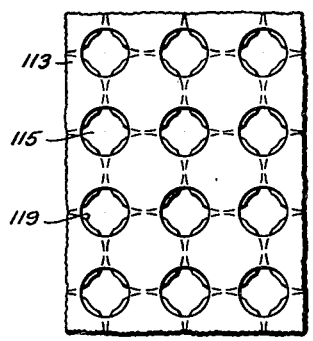
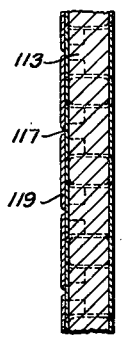
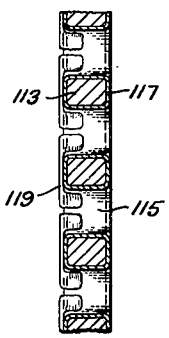
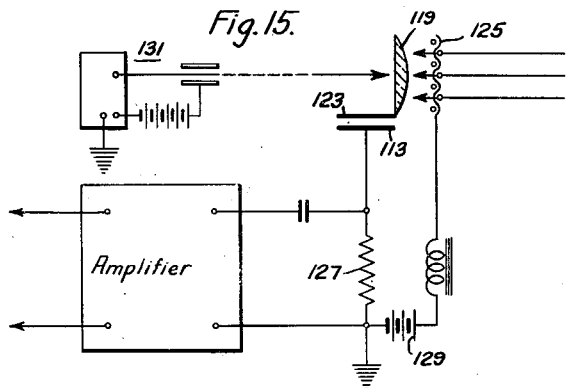
INVENTOR
Vladimir K. Zworykin.
BY
ATTORNEY Patented June 17, 1941

2,246,283

UNITED STATES PATENT OFFICE 2,246,283

PHOTOELECTRIC MOSAIC

Vladimir K. Zworykin, Swissvale, Pa., assignor to Westinghouse Electric & Manufacturing Company, a corporation of Pennsylvania Application May 1, 1930, Serial No. 448,834

4 Claims. (Cl. 250—164)

My invention relates to view-transmission systems and it has particular relation to the light-sensitive devices used in such systems for the purpose of deriving a fluctuating electric current representative of a view or a picture being transmitted. Certain subject matter described herein is claimed in my Patent No. 2,141,059 and in my pending applications Serial No. 220,206, filed July 20, 1938, 242,505, filed November 26, 1938, 246,783, filed December 20, 1938, and 254,607, filed February 4, 1939, all assigned to the Westinghouse Electric & Manufacturing Company, of East Pittsburgh, Pennsylvania.

In my copending application, Serial No. 376,117, filed July 5, 1929, and assigned to the Westinghouse Electric and Manufacturing Company, I have disclosed a view-transmission system whereby a reproduction of a motion-picture film can be obtained, electrically, at a distance. The transmitting portion of the disclosed system comprises means for moving a film, longitudinally thereof, at a constant speed adjacent to a single photo-electric cell and means whereby the film, in its passage, is subjected to the action of a scanning-ray of light that moves rapidly from side to side across it.

In the operation of the system disclosed in my copending application Serial No. 376,117, assuming that the film is advancing at the rate of 12 "frames" per second between the scanning ray and the photo-electric cell, that each picture "frame" is scanned by one hundred transverse lines and that each scanning-line is divided into 100 linear picture-elements, it is apparent that each of the picture-elements is exposed to the light during a time-interval of only 1/120,000 of a second and is represented by an infinitesimally small change in the output current from the photo-electric cell.

It would be highly desirable if the photo-electric cell could be exposed for a longer time to the light passing through each picture-element but, if the scanning rate is made lower, the picture could not be transmitted with sufficient rapidity to give rise to the illusion of motion at the receiving end.

Since a reduction in the scanning rate is impracticable, attention has been paid to the development of photo-electric cells of greater sensitivity, and I have achieved a certain measure of success in that direction by the utilization of caesium oxide as a cathode material. The most sensitive cells known at present, however, must be followed by multi-stage amplifiers before their output currents, representing picture-elements, can be employed for controlling the transmission of energy to distant points.

Furthermore, the development of direct-view television systems, of the type exemplified by the system set forth in my copending application Serial No. 683,337, filed December 29, 1923, has been hampered by the high cost of the light-sensitive cathode-ray tubes used therein, since the said tubes do not lend themselves readily to factory-production methods.

It is, accordingly, an object of my invention to provide an improved light-sensitive cathode-ray tube that shall be inexpensive to manufacture, and capable of being utilized in a view-transmission system of either the direct or the indirect type.

Another object of my invention is to provide an improved view-transmission system wherein a light-sensitive cathode-ray tube is employed.

A light-sensitive cathode-ray tube, constructed according to preferred embodiment of my invention, includes the following elements:

(A) A screen constituted by a plurality of minute light-sensitive elements that are insulated from each other and from ground;

(B) A common anode disposed in spaced relation to the said elements;

(C) A common collector element mounted in spaced relation to said light-sensitive elements;

(D) Controllable means for producing a cathode ray; and (E) Means for causing the ray to successively explore the rear surface of the screen.

When my improved cathode-ray tube is employed in a view-transmission system, of either the direct or the indirect type, the view is focused continuously upon the entire light-sensitive face of the screen and the individual elements thereof, by reason of their distributed capacity to ground, acquire positive charges proportional to the intensity and duration of the light.

The cathode-ray, as it explores the surface of the screen, also falls upon the collector-element and causes an electronic flow thereover back to the source of the ray. The ray, however, each time it impinges upon one of the positively charged photo-cells, is robbed of sufficient electrons to neutralize the charge acquired by the cell and, consequently, the steady flow of electrons is modulated, sequentially, to an extent proportional to the charges on the successive cells over which it sweeps.

In order that the modulation of the electronic stream may be utilized, I interpose a resistor in the circuit to interconnect the collector-element and the cathode-ray source and connect the input terminals of an amplifier across the resistor. The output current from the amplifier may be used to control the radiation of modulated high-frequency energy or the transmission of energy over metallic conductors to a plurality of view-receiving stations.

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawings, wherein Figure 1 is a diagrammatic view illustrating the usual way in which photo-electric cells are employed in television systems;

Fig. 2 is a simplified diagrammatic view of certain constituent elements of an improved television system constructed according to one modification of my invention;

Fig. 3 is a diagrammatic view of a complete television system, constructed and organized according to a preferred embodiment of my invention, adapted to the purpose of transmitting film-facsimiles or direct views.

Fig. 4 is a plan view, partly in section, of an actual light-sensitive cathode-ray tube of the type shown diagrammatically in Fig. 3;

Fig. 5 is an end view, partly in section, of the light-sensitive electrode-assembly of the tube shown in Fig. 4;

Fig. 6 is a sectional view of the electrode-assembly taken along a line corresponding to the line VI—VI in Fig. 5;

Fig. 7 is a sectional view of the electrode-assembly taken along a line corresponding to the line VII—VII in Fig. 5;

Figs. 8 and 9 are enlarged fragmentary front and rear views, respectively, of an electrode-assembly of alternative type;

Fig. 10 is a sectional view of the light-sensitive-electrode-assembly illustrated in Figs. 8 and 9, taken along a line corresponding to the line X—X of Fig. 8;

Figs. 11 and 12 are enlarged fragmentary front and rear views, respectively, of a light-sensitive screen of a further alternative type;

Figs. 13 and 14 are sectional views of the light-sensitive screen illustrated in Fig. 11; and Fig. 15 is a simplified diagrammatic view of a view-transmission system wherein a screen of the type shown in Figs. 11 to 14 is used:

In order that the principles underlying my invention may be thoroughly understood, a brief résumé of the action of the photo-electric cell shown in my copending application, Serial No. 376,117, hereinbefore referred to, will now be given, in connection with Fig. 1 of the drawings.

The apparatus illustrated in Fig. 1 comprises a photo-electric cell 1 having an anode 3 and a cathode 5 that are interconnected through a potential-source 7 and a resistor 9, the resistor being disposed across the input terminals of a suitable aperiodic amplifier 11. A blocking condenser 13, preferably, is interposed between one terminal of the resistor and the amplifier, and the negative terminal of the potential-source 7 may be provided with a connection 15 to ground, if desired.

When the photo-electric cell is exposed to the light that has passed through a moving film (not shown) from a transversely moving scanning-ray, or to light that is reflected from an object from a similar scanning-ray, each picture element is represented by an instantaneous minute change in the current flowing in the resistor 9, the amplitude of the current depending upon the intensity of the light and the duration of exposure of the cell to it. If, as previously mentioned, a single frame of a film passes between the scanning-ray and the photo-electric cell in one second, and if the frame is scanned by one hundred lines, the photo-electric cell will be exposed to light representing one ten-thousandth of the frame-area during the very small time-interval of $1/120000$ of a second.

Obviously, the change in the output current from the photo-electric cell, for such a short exposure, is infinitesimal and, with the most sensitive cells now available, it is of the order of $3/10-9$ to $3/10-6$ amperes.

Since the limit in photo-electric cell sensitivity seems to have been substantially reached, an increase in cell output current must be obtained through a radical modification of heretofore known scanning methods. I propose, accordingly, to permit light from the view or picture being "televisioned" to fall continuously upon a screen constituted by a plurality of small photo-electric cells, to store, in a plurality of individual reservoirs, the simultaneous output currents from the several cells and to, thereafter, successively discharge the current-storage reservoirs, at the scanning frequency, in order to derive readily amplifiable currents representative of the picture-elements.

If the screen is to be used in television systems of the direct-view type, it may of such size that the entire view can be focused thereon; if it is to be used in film-facsimile systems, it may be constituted by a plurality of small photo-electric cells, linearly disposed, since the travel of the film through the apparatus takes the place of the vertical component of the motion of the scanning-ray. Inasmuch as the structure of the screen, insofar as the individual photo-electric elements thereof are concerned, is not dependent upon the dimensions thereof, it should be clearly understood that, whenever the term "screen" is used, hereinafter, either the linear or the planar type of screen is inferred, except in those instances where the meaning of the term is clearly determinable from the context.

The theory underlying the manner of operation of my improved view-transmission system will be clearly understood from a consideration of Fig. 2 of the drawings wherein a single one of the plurality of screen elements is shown as a photo-electric cell 17 having an anode 19 and a cathode 21, the said electrodes being interconnected through a potential source 23 and a condenser 25.

In the operation of the system exemplified by Fig. 2 of the drawings, the light from an element of the view, whether it be an image directly focused upon the screen or from an illuminated translucent web, such as a motion-picture film, impinging continuously upon the photo-electric cell 17, causes the upper plate of the condenser 25 to acquire a positive charge proportional to the intensity and duration of the light falling upon the cell. In order that the condenser may be discharged, periodically, a similar photo-electric cell 27 and a resistor 28 may be connected in shunt relation thereto, and a light source (not shown) may be so disposed with respect to the second photo-electric cell as to illuminate it intermittently at the scanning rate.

Assuming that the cells 17 and 27, in Fig. 2, are representative of a single element of a screen of the linear type comprising any desired number of pairs of cells, one hundred, for example, and that a magnified image of a motion-picture film is caused to move across the screen in a direction transverse to the linear extension thereof, it is evident that the effect of transverse scanning of the moving film by a vibrating light-ray may be obtained by causing a ray of light to traverse, repeatedly, the cathodes of the cells 27 instead of the film. In such event, the discharge current from any individual cell, representing the light from a single picture-element, is as many times greater than if the film were directly scanned by the light ray as the time of a single traverse of the discharge-ray across the entire screen is greater than the time required for the direct scanning of the said picture-element. In other words, by causing the light to stay on the individual photo-electric element in my improved screen one hundred times longer, I am enabled to obtain one hundred times more output current, representative of a single picture-element, than if a single large photo-electric cell were used.

By reason of manufacturing difficulties, however, it is quite expensive to provide each of the light-sensitive elements of the screen, that are exposed to the view to be transmitted, with an actual storage condenser and an individual condenser-discharging photo-electric cell. I have found it expedient, therefore, to utilize the distributed capacity to ground of the individual photo-electric cells as the storage reservoirs and to provide a source of cathode-rays for dissipating the charges stored in the said distributed capacity.

A further modification of my invention, therefore, as illustrated in Fig. 3 of the drawings, comprises an evacuated container 29 having a conical central portion 30, a circular front portion 31 and a cylindrical rear portion 32. A screen, constituted by a plurality of photo-sensitive cathodes 33, that are insulated from each other and from ground, is disposed within the front portion 31 of the container. Each cathode has a definite distributed capacity to ground which is indicated in the drawings by the condensers 34 shown in dotted lines. A common anode 35 is provided for all of the photo-sensitive cathodes, and potential is supplied thereto from a common source 37.

Each individual cathode 33 has a conductive portion 39, which extends rearwardly of the screen, and a common collector-element 41 is disposed in spaced relation to all of the said portions and insulated therefrom. The collector element is connected to the negative terminal of the potential source 37 through a resistor 43. A conductor 45 extends from the negative terminal of the potential source 37 to ground. The ends of the resistor are connected, respectively, to the input terminals of an amplifier 46 that may be of any suitable type.

A controllable source of cathode-rays, or an electron "gun," is supported from a "press" 47 disposed within the cylindrical rear portion 32 of the container 30. The "gun" comprises a thermionic cathode constituted by a metallic thimble 48 having an active end portion 49, a cylindrical grid 51 that surrounds the cathode and a cylindrical anode 53 disposed coaxially with the grid. The cathode is provided with a heater 54, preferably constituted by a filamentary resistor imbedded in vitreous material or clay (not shown). The thimble, grid and anode are, preferably, fabricated from non-magnetic material such as tantalum, or a 50% nickel-copper alloy.

Any suitable potential source 55 may be connected across the terminals of the heater 54, and a single high potential source 57, the positive terminal of which is connected to ground, is provided for biasing the anode 53 and a focusing layer 59 of conductive material carried upon the major portion of the interior surface of the large end of the container positively with respect to the cathode.

In order that the cathode-ray shall be caused to repeatedly sweep over the backward-extending portions 39 of the photo-sensitive cathodes 33 and the collector-element 41, a plurality of deflector members, such as plates 61 and 63 or a plurality of coils (not shown) are provided.

A control-condenser 65 is connected in shunt relation to the deflecting plates, and charging means for the condenser, constituted by a rectifying device 67, a resistor 69 and a high-potential source 71, are provided. The time required by the ray to travel from one end of the rear surface of the screen to the other end, under the influence of the field between the plates 61 and 63, is determined by the rate at which the charge builds up on the condenser, which rate is dependent upon the relative magnitudes of the condenser 65 and the resistor 69.

Since it is necessary to cause the ray to quickly return to its starting point at the end of each traverse, a short-circuiting device is connected in shunt relation to the control-condenser 65. The short-circuiting device, preferably, takes the form of a thermionic triode 72 having an input electrode 73 normally biased negatively to the cut-off point by a source 75 of biasing potential and provided with means, such as a 480 cycle oscillator 77, for periodically overcoming the grid-biasing potential to thereby permit the short-circuiting device to become conductive.

It is highly desirable that the cathode-ray shall repeatedly traverse the screen in one direction only and that it shall be diverted therefrom during the return intervals. For that purpose, the primary winding 78 of a transformer 79 is connected between the anode of the short-circuiting tube and one terminal of the condenser 65, and the secondary winding 80 of the transformer together with a source 81 of negative biasing potential, is connected between the grid 51 of the electron "gun" and the cathode-thimble 48. The transformer-winding connections are so chosen that, upon the flow of the condenser-discharge current in the short-circuiting tube 71, sufficient additional negative potential is applied to the grid 51 of the electron "gun", with respect to the cathode 48 thereof, to substantially cut off all electron-flow from the said cathode. The cathode-ray, therefore, is of normal intensity as it traverses the screen in one direction during the charging of the condenser 65, and is of very low intensity as it returns to the initial point preparatory to the next succeeding swing.

From the foregoing it will be seen that, in the embodiment of my present invention, wherein a motion-picture film is televisioned and moved at the proper rate with respect to the path traversed by the cathode ray, this path remaining substantially in a given plane perpendicular to the screen onto which the film is projected and the cathode ray deflected back and forth repeatedly across the image on the screen, that is, first in one direction along said path from an initial point and then back in the opposite or return direction to the initial point, the result will be a scanning of the image along a saw-tooth, the height or altitude of the teeth being determined by the amplitude or degree of deflection of the ray by the plates 61 and 63, the pitch of the teeth or distance between adjacent tooth-points being determined by the rate of movement or travel of the film. When it is desired to employ the action just described, which I refer to as saw-tooth scanning, the adjustments in the system are such that the intensity of the cathode ray is normal as it traverses the screen in one direction but is of relatively low intensity as it returns in the opposite direction to that side of the screen from whence it started the preceding effective scanning movement.

When, however, the adjustments in the system are such that the electron flow from the cathode is entirely or substantially entirely cut off upon and during discharge of the condenser 65, the result is that the cathode ray is put out at the beginning of and during the return movement back to that side of the screen from whence it will start the next effective scanning movement. The result of such action is that the screen is scanned by parallel lines, each starting at the same side of the screen and ending abruptly at the other side, these lines being made one after the other in rapid succession at a rate determined by the rate of charging and discharging of condenser 65. This method or manner of scanning, I refer to as unilateral scanning.

In the operation of my improved system, when motion-picture films or the like are "televisioned", an enlarged image of a minor longitudinal portion of a moving film is cast upon the cathode screen by an appropriate optical system (not shown) in alignment with the light-sensitive elements thereof, as indicated by a plurality of arrows 83 in Fig. 3 which represent instantaneous light-intensities. Each individual cathode emits electrons under the influence of the light impinging upon it and acquires a positive charge, with respect to ground, proportional to the intensity and duration of the light from a single minor view-element.

Were it not for the positive charges acquired by the screen-elements, the moving cathode-ray, falling upon the collector element 41, would give rise to a steady uni-directional electron flow over the resistor 43 and, through the grounded conductor 45, back to the cathode of the electron "gun." By reason of the said positive charges, however, the cathode-ray is, successively, robbed of sufficient electrons for the neutralization thereof, as it traverses the conductive extensions 39 of the photo-sensitive cathodes, and the electronic flow through the resistor 43, consequently, is modulated to an equivalent extent.

Each time, therefore, that the cathode-ray sweeps, with full strength, from one end of the screen to the other, the current through the resistor 43 is caused to pulsate, and the pulsations are amplified by the amplifier 46 for subsequent action of any suitable radio or wire transmitter. It should be clearly understood, in this connection, that the output current from each screen-element 33, since it is equivalent to the charging current to the distributed capacity to ground 34 associated with the said element during the entire time that the ray requires to return thereto from the last preceding contact therewith, is very much greater than when only a single photoelectric cell is used, as taught by the prior art.

My improved cathode-ray tube, having a linear screen, may also be employed, without material modification, for the direct "televisioning" of illuminated animate or inanimate objects. When the system is organized for direct television an image of the object is formed, by appropriate optical means, in the plane of the photo-sensitive cathodes constituting the screen, and the said image, through the use of a rotating polygonal mirror, or a similar device, is caused to repeatedly move over the screen in a direction perpendicular to the linear extension thereof, thus simulating the movement of a film. For satisfactory results, the rate of movement of the image should be such that at least twelve images per second are completely explored by the screen.

An actual cathode-ray device, except that the relative dimensions of the parts thereof may be widely departed from in practice, of the type shown only diagrammatically in Fig. 3, is illustrated in Figs. 4, 5, 6 and 7, wherein the parts analagous to those of the tube shown in Fig. 3 are similarly designated.

As hereinbefore described, the device comprises an evacuated container 29 having a conical central portion 30, a circular front portion 31 and a cylindrical rear portion 32 wherein the electron "gun" is disposed.

The light-sensitive electrode-assembly is mounted in the circular end portion 31 of the device and is constituted by a stack of interleaved metallic electrodes 85 and glass insulators 87 that are compressed between two lavite end-plates 89 by a plurality of tie-rods 91.

Each end of each of the insulators 87 is shaped to conform to the tie-rod adjacent thereto, in order that the insulators shall be prevented from twisting, as indicated in Figs. 6 and 7.

Each of the metallic electrodes has a front, bent-over silver-plated portion that carries one of the small photo-sensitive cathodes 33 and a rearwardly extending portion corresponding to the element 39 shown in Fig. 3. Each portion 39 has an opening 92 extending therethrough to accommodate the collector-element 41 that is common to all of the portions 39 and is supported from the end-plates 89.

The common anode 35 is also supported from the end-plates 89 and is disposed closely adjacent to the cathodes 33.

The entire electrode assembly is supported by a plurality of rods 93 that are imbedded in a plurality of presses 95 and 97 that extend inwardly from the periphery of the circular portion 31 of the tube. The anode 35, the collector 41 and the tie rods 91 are, respectively, provided with leads 99, 101 and 103 that extend through the presses to the extent of the tube.

It will be noted, from an inspection of Fig. 5, that the main tie rods 91 are electrically connected together and are indicated as being connected to ground. By reason of this fact, therefore, each of the photoelectrically active cathodes 33 has a definite capacity to ground, as indicated by the condensers 34 shown in dotted line in Fig. 3 of the drawings.

In the process of manufacturing my improved cathode-ray device, after the electron "gun" and the unsensitized screen-electrode assembly are mounted within the container, the silver-plated surfaces of the cathode-electrodes are oxidized to a definite degree by causing an electric discharge to occur between two electrodes, such as the common anode 35 and the common collector 41, in an atmosphere of oxygen.

The device is next thoroughly evacuated and the electrodes de-gasified by methods well known to those skilled in the art. A nickel receptacle positioned within the container adjacent to the silvered portions of the cathode-electrodes) that contains a material, such as a mixture of caesium dichromate and silicon, which will free caesium when heated, is heated by high frequency currents induced therein by an internal coil. This frees the caesium and it is deposited upon the ends of the electrodes carrying the oxidized silver coating.

The device is then heated to a temperature of between 150° and 200° centigrade and maintained thereat until the silver-oxide-coated portions of the electrodes assume a "rusty" yellow color indicative of the completion of the sensitizing process. The color is probably caused by the formation of sub-oxides of caesium.

The device is next given a final exhaust to remove all residual gases and is sealed off from the pump.

It is also feasible to construct an electrode assembly, of either the linear or planar type, by the fusion together of a plurality of small cylinders of insulating material, the axes of which are parallel and perpendicular to the front and rear surfaces of the screen. Such screen is exemplified in Figs. 8, 9, and 10 of the drawings.

Referring specifically to Figs. 8, 9, and 10, a plurality of glass cylinders 105 are fused together to constitute an insulating support somewhat analogous, in superficial appearance to an empty honey-comb. One face of the composite insulator is provided with a metallic coating 107 by spraying from a Schoop-pistol or by an electroplating. A silver rivet 109 extends through each of the small glass cylinders, the ends of each rivet being split and opened up slightly to prevent them from loosening. The split ends of the rivets are in capacitative relation to the conductive layer 107 which corresponds, in function, to the collector element 41 shown in Figs. 3 and 4.

The rounded surfaces of the rivet-heads are provided with layers of photo-electrically active material (not shown), such as caesium-oxide, and each rivet is thoroughly insulated from the neighboring rivets by the glass cylinders.

When a screen of the type illustrated in Figs. 8, 9 and 10 is mounted in a cathode-ray tube of the type hereinbefore described, a common anode element, analogous to the element 35 in Figs. 3 and 4, is disposed in spaced relation to the photosensitive rivet heads.

Instead of constructing the light-sensitive screen by assembling together a plurality of physically separate photo-cells, it also lies within the scope of my invention to form the said cells in situ upon a single supporting member.

Referring specifically to Figs. 11, 12, 13 and 14 of the drawings, the supporting member, instead of being constituted by a plurality of glass cylinders, may be a metallic plate 113 having a plurality of openings 115 extending therethrough, or a piece of woven metallic gauze.

In the preparation of the screen, it is first entirely coated with a thin layer 117 of material, such as porcelain and, thereafter, it is thoroughly "fired" to produce a glazed, insulating coating. As an alternative method, the perforated sheet may be made of aluminum, the surface of which is oxidized, electrolytically or otherwise, to form the insulating coating.

The prepared sheet is next subjected to the action of a metal-spraying gun of the Schoop type and a great number of separated spots 119 of metallic silver are deposited thereon. The proper positioning of the silver spots may be assured by interposing a perforated plate between the gun and the prepared sheet or they may be deposited by any other convenient method such as sputtering, evaporation, or electrolytic deposition. Irrespective of the method employed, however, great precaution should be taken to ensure that the silver spots are each electrically disconnected from the others since it is upon their complete insulation that satisfactory operation depends.

The plate carrying the silver spots is next subjected to an oxidizing process to form a coating of silver oxide on each of the said spots. The oxidation of the silver spots may be satisfactorily accomplished by subjecting the plate to an electric discharge in an atmosphere of oxygen.

The final step in the process consists in heating the plate in the presence of vaporized caesium to render each of the silver spots photo-sensitive. A sub-oxide of caesium is probably formed during the heating process but, of this fact, I am not quite certain.

The sensitive screen, in its final form, therefore, comprises a conductive base, an insulating layer and a large number of small, electrically separated photo-sensitive spots carried upon the insulating layer, portions of the periphery of each spot slightly overlapping the margins of the adjacent perforations in the plate and extending thereinto.

The modified light-sensitive screen, just described, is particularly adapted for use in television systems of the direct view type, wherein the entire image of the object to be televised is focused upon the screen, and a scanning cathode-ray is caused to repeatedly traverse the rear surface thereof. When so used, a common anode, preferably a screen made from very fine wire having a relatively coarse mesh, is mounted in the tube closely adjacent to the light-sensitive spots, and a single conductive connection is made to the metallic plate that supports the said cathodes.

In order that the operation of the screen shall be understood, when it is subjected to the simultaneous action of light and a cathode-ray, I have illustrated, diagrammatically, in Fig. 15, the electrical circuit of a single spot, to which figure attention should now be directed.

Referring specifically to Fig. 15, the condenser 123 represents the capacity of a single photoelectric spot 119 with respect to the supporting plate 113. An anode 125, a resistor 127, a biasing battery 129 and a source 131 of cathode-rays are common to all of the photo-electric spots.

When the spot is illuminated, a charging current flows into the condenser 123, making the photo-electric element 119 positive with respect to the conducting plate 113. The potential of the battery 129 and the magnitude of the resistor 127 are so chosen that, during at least $\frac{1}{12}$ of a second, if illumination is maximum, the condenser receives a charge "C" slightly less than its maximum capacity. If we denote the charging current for each spot as "I" and the entire number of spots as "N" then the total charging current, for illumination of the entire screen under maximum light conditions, is "NI" amperes.

Now, if the cathode-ray, in sweeping over the entire screen, in 1/12 of a second, under the influence of a plurality of deflecting elements (not shown), has an intensity such that it will just completely neutralize the charge "C" of any one of the spots during an interval of time equal to 1/12 M, then the discharge current will flow in the circuit in a direction opposite to that of the charging current, and its value, for one element, will be N times greater than that of the charging current thereto. Such being the case, the discharge current from a single element, for an evenly illuminated screen, will be equal to the total charging current for the entire screen. Inasmuch as the charging current may, for practical purposes, be regarded as devoid of fluctuations and, since the discharge current is constituted by a succession of impulses at very high frequency, it is comparatively simple to separate the discharge currents by properly designed filters and to amplify them before impressing them upon a transmitting medium.

It will, accordingly, be apparent that, when a view, considered as comprising "N" view-elements, is impressed upon the sensitive screen, the charging currents to the tiny cells, covered by the view, during 1/12 of a second, are proportional to the varying light and shade of the view-elements. The discharge currents, representative of successive view-elements, when the cells are successively exposed to the scanning-ray, are equal to the charging currents and, accordingly, are "N" times greater than in television systems of the type wherein one or more photo-electric cells are momentarily exposed to light from successive view-elements. For 100 line pictures, the photo-electric current is substantially 10,000 times as great as in conventional systems.

In the reception of a televisioned view I prefer to utilize a tube (not shown) having a fluorescent screen over which a cathode-ray is caused to move in synchronism with the ray in the transmitting tube. The receiving tube is provided also with a control-electrode, interposed between the source of the ray and the screen, upon which electrode the received impulses, proportional to the instantaneous discharge currents of the minute photo-electric cells in the transmitting tube, are impressed to control the intensity of the ray. Such tube forms no part of the present invention, it being obvious that other well-known receiving devices may be utilized.

It will be apparent, from a careful consideration of the foregoing description of certain specific embodiments of my invention, that a light-sensitive cathode-ray tube constructed in accordance therewith has an apparent sensitivity, by reason of the large output currents obtainable therefrom, which is many times greater than the sensitivity of a single photo-electric cell, no matter how large, when used in television systems constructed and organized according to the teachings of the prior art.

Furthermore, since scanning is accomplished by electronic means devoid of inertia, instead of by mechanical means, my improved television transmitter is noiseless and does not easily get out of adjustment.

In short, my invention provides means whereby the direct transmission of views of animate or inanimate objects can be accomplished and, accordingly, is an important step forward in the art of television.

Although I have shown and described several specific embodiments of my invention, I am fully aware that many other modifications thereof are possible. My invention, therefore, is not to be restricted except insofar as is necessitated by the prior art and by the spirit of the appended claims.

I claim as my invention:

1. As an article of manufacture, a screen for a view-transmitting device comprising a plurality of conductively isolated photo-electric elements disposed in capacitative relation to a common conductive element.

2. As an article of manufacture, a screen for a view-transmitting device comprising a plurality of conductively isolated photo-electric cathode elements capacitatively associated with a common conductive element and with a common anode.

3. An image screen for an electrical view-reproducing system comprising a layer of insulating material having one side faced with an electrical conductor which has lateral electrical conductivity, and having its other side surfaced with discrete particles of a photo-electric material.

4. An image screen for an electrical view reproducing system comprising a support member of insulating material having one side faced with an electrical conductor having lateral electrical conductivity, and having its other side surfaced and in contact with a layer of discrete and isolated particles of radiant energy responsive material.

VLADIMIR K. ZWORYKIN.